United States Patent [19]

Dresen et al.

[11] Patent Number: 5,184,866

[45] Date of Patent: Feb. 9, 1993

[54] MOTOR VEHICLE WINDSHIELD VISOR

[75] Inventors: William L. Dresen, Baraboo; Karl A. Niemi, Madison; Phillip L. Emery, Portage; David G. Grunow, Oconto, all of Wis.

[73] Assignee: Penda Corporation, Portage, Wis.

[21] Appl. No.: 847,706

[22] Filed: Mar. 6, 1992

[51] Int. Cl.⁵ .................................................. B60J 3/00
[52] U.S. Cl. .................................... 296/95.1; 296/91; 296/180.1
[58] Field of Search .................. 296/95.1, 91, 180.1; D12/191

[56] References Cited

U.S. PATENT DOCUMENTS

| | | | |
|---|---|---|---|
| D. 78,655 | 5/1929 | Roberts et al. | D12/191 |
| D. 85,241 | 9/1931 | Henderson | D12/191 |
| D. 85,981 | 1/1932 | Henderson | D12/191 |
| D. 102,974 | 1/1937 | Pritchard | D12/191 |
| D. 152,738 | 2/1949 | Riemann | D12/191 |
| D. 154,668 | 7/1949 | Tanzola | D12/191 |
| D. 154,735 | 8/1949 | Arbib | D12/191 |
| D. 154,789 | 8/1949 | Maher | D12/191 |
| D. 154,861 | 8/1949 | Maher | D14/6 |
| D. 155,030 | 8/1949 | Oswald | D14/6 |
| D. 155,434 | 10/1949 | Maher | D14/6 |
| D. 156,479 | 12/1949 | Bingman | D14/6 |
| D. 157,555 | 3/1950 | Abrams | D14/6 |
| D. 159,041 | 6/1950 | Bihlmire | D14/6 |
| D. 159,062 | 6/1950 | Hallstead | D14/6 |
| D. 159,144 | 6/1950 | Diedterich | D14/6 |
| D. 161,436 | 1/1951 | Fauser | D14/6 |
| D. 162,831 | 4/1951 | Huntoon | D14/6 |
| D. 175,324 | 8/1955 | Sullivan | D14/6 |
| D. 203,815 | 2/1966 | Lutz et al. | D14/6 |
| D. 239,705 | 4/1976 | Lund | D12/191 |
| D. 243,840 | 3/1977 | Gafnea | D12/191 |
| D. 261,500 | 10/1981 | Butler | D12/16 |
| D. 273,672 | 5/1984 | Lund | D12/191 |
| D. 277,273 | 1/1985 | Schmidt | D12/181 |
| D. 286,611 | 4/1986 | Kingsley | D12/191 |
| D. 288,309 | 2/1987 | Lund | D12/191 |
| D. 288,310 | 2/1987 | Lund | D12/191 |
| D. 291,295 | 8/1987 | Lund | D12/191 |
| D. 299,713 | 2/1989 | Dunham | D12/191 |
| D. 301,028 | 5/1989 | Buck | D12/191 |
| D. 301,450 | 6/1989 | Kingsley | D12/191 |
| D. 303,239 | 9/1989 | Gempel et al. | D12/191 |
| D. 303,948 | 10/1989 | Bonstead et al. | D12/191 |
| D. 312,238 | 11/1990 | Lund | D12/191 |
| D. 315,891 | 4/1991 | Down | D12/191 |
| 2,264,014 | 11/1941 | Wohfield | |
| 2,497,050 | 2/1950 | Thibault | 296/95 |
| 2,500,406 | 3/1950 | Greenfield | 296/95 |
| 2,548,068 | 4/1951 | Rountree et al. | 296/95 |
| 2,567,501 | 9/1951 | Zeis et al. | 296/95 |
| 2,599,809 | 6/1952 | Branch | 296/95 |
| 2,614,628 | 10/1952 | Riemann | 160/211 |
| 2,625,425 | 1/1953 | Foster | 296/95 |
| 2,628,124 | 2/1953 | Dieterich | 296/95 |
| 2,628,807 | 2/1953 | Lincoln | 248/226 |
| 2,643,909 | 6/1953 | Foster | 296/95 |
| 2,650,130 | 8/1953 | Maher | 296/95 |
| 2,777,732 | 1/1957 | Walsh | 296/95 |
| 4,018,472 | 4/1977 | Mason, Jr. | 296/1 |
| 4,412,698 | 11/1983 | Kingsley | 296/97 |
| 4,726,619 | 2/1988 | Haugestad | 296/95 |
| 4,758,040 | 7/1988 | Kingsley et al. | 296/97 |
| 4,842,320 | 6/1989 | Kingsley | 296/95.1 |
| 4,966,404 | 10/1990 | Lund | 296/95.1 |

OTHER PUBLICATIONS

Scotch ™ VHB ™ Joining Systems, 3M, St. Paul, Minn., Jun. 1988.

Primary Examiner—Robert R. Song
Attorney, Agent, or Firm—Lathrop & Clark

[57] ABSTRACT

A structural reinforced injection-molded fiberglass visor shell has a laterally extending upper member which extends frontwardly above and provides shade to a vehicle windshield. Three attachment pods extend downwardly from the upper member and have pod floors which conform to the geometry of a vehicle cab upper surface. Side walls extend upwardly from the pod floors and are connected to the upper member. Access holes are provided in the upper member for the insertion of fasteners through the pod floors into the vehicle cab surface. Alternatively, the pod floors may be adhesively attached to the cab by means of structural adhesive tape or bolt-retaining strips adhesively taped the cab surface. The same visor shell may be economically manufactured for a wide variety of vehicles by substituting different pods configured for a particular make of vehicle.

12 Claims, 8 Drawing Sheets

MOTOR VEHICLE WINDSHIELD VISOR

FIELD OF THE INVENTION

The present invention relates to accessories for motor vehicles in general and to visors for shielding motor vehicle windshields from sun and rain in particular.

BACKGROUND OF THE INVENTION

Exterior sun visors which protrude from a vehicle roof forwardly of the windshield can effectively shade the vehicle cab interior and reduce the glare from the overhead rays of the sun. Aside from increasing passenger comfort and driver safety, visors may also extend the life of plastic dashboards and vehicle interiors by reducing cabin temperatures and limiting the exposure of the cabin interior to direct sunlight.

In addition to providing these functional benefits, some visors—sold as after-market accessories—provide a distinctive appearance which motorists may utilize to customize and distinguish their vehicles.

Early sun visors were fabricated of sheet metal and were hence quite heavy and advantageously rigid. As many early automobiles featured two-part segmented windshields having a central structural dividing bar, these early visors could be effectively supported by rigid metal struts bolted to the windshield side and center pillars.

Advances in automotive design and engineering substituted a one-piece curved windshield glass for the early segmented type and eliminated the central windshield pillar. Fiberglass and plastic fabrication techniques have allowed visors to be produced with weights much less than sheet metal visors. However, due to the extensive air flows over and around a moving vehicle, a visor is subjected to significant aerodynamic loads which must be countered by rigidly fixing the visor at multiple locations to the vehicle cab. Conventional sun visors are typically bolted to the vehicle cab roof at one or more central locations and at the roof sides. It has also been known to connect visor side ears to the front corner pillars. However, recent trends in automotive design have resulted in a substantial elimination of exposed corner pillars in many models.

Fiberglass and plastic visors typically are of a single sheet molded into a particular design configuration. Portions of the visor which are to be attached to the vehicle roof are placed flush with the roof and must be recessed beneath the overall visor surface or extended on tabs in many instances to permit portions of the visor to be elevated above the vehicle cab roof or to be spaced forwardly from the cab roof to permit oncoming air to pass beneath the visor. This flush mounting of the visor sheet material presents significant limitations to the appearance possibilities of such visors. Furthermore, the exposed heads of the attachment fasteners, even if painted to match the vehicle body color, are in dramatic contrast to the sleek fit and finish which is a desirable feature of modern automobiles.

Furthermore, as each automotive manufacturer produces vehicles with distinct cab dimensions and roof curvatures, separate and costly molds will typically need to be produced to form a distinct visor for each variety of motor vehicle.

What is needed is an attractive sun visor, the appearance features of which are not severally limited by the attachment mechanics, which is rigid and resistant to undesirable aerodynamic vibrations, and which may be produced for use on a wide variety of motor vehicles with minor manufacturing modifications.

SUMMARY OF THE INVENTION

The visor of the present invention is adapted for mounting to a vehicle having a windshield and a cab surface above the windshield. The visor is formed in a low pressure injection-molded fiberglass reinforced process and has a visor shell with an upper laterally extending visor member which is adapted to extend forwardly above and to shade the vehicle windshield. A plurality of fiberglass attachment pods are connected to the visor upper member and extend downwardly into contact with the vehicle cab surface. Each attachment pod has an attachment floor which engages against the vehicle cab surface above the vehicle windshield. A pod side wall extends upwardly from each attachment floor and engages with and is adhesively connected to the visor upper member or formed integrally with the visor upper member. The pod floor, side wall, and visor upper member define a rigid compartment. The pod acts to space the visor upper member from the vehicle cab surface to define passages beneath the upper member for the flow of air therethrough. Holes are located in each pod floor through which a self-tapping screw may be inserted to connect the pods to the cab surface. Access holes are located in the visor upper member above each fastener hole to permit installation and removal of the visor. Sealing plugs then cover each access hole and are sealed to prevent water build up within the pods. The pods, visor member and plugs will typically be painted to match the vehicle body color.

The same molded fiberglass visor shell may be utilized in visors configured for many different vehicles by substituting pods tailored to a particular vehicle cab geometry.

It is an object of the present invention to provide a motor vehicle visor which may be rigidly connected to a vehicle cab.

It is also an object of the present invention to provide a motor vehicle visor, the exterior surface of which is substantially unaffected by the placement of fastening points.

It is another object of the present invention to provide a motor vehicle visor which may be economically manufactured to suit a wide variety of motor vehicle models.

It is yet another object of the present invention to provide a motor vehicle visor which may be attached to a motor vehicle having inaccessible side pillars.

Further objects, features and advantages of the invention will be apparent from the following detailed description when taken in conjunction with the accompanying drawings.

DESCRIPTION OF THE PREFERRED EMBODIMENT

Figure 1:
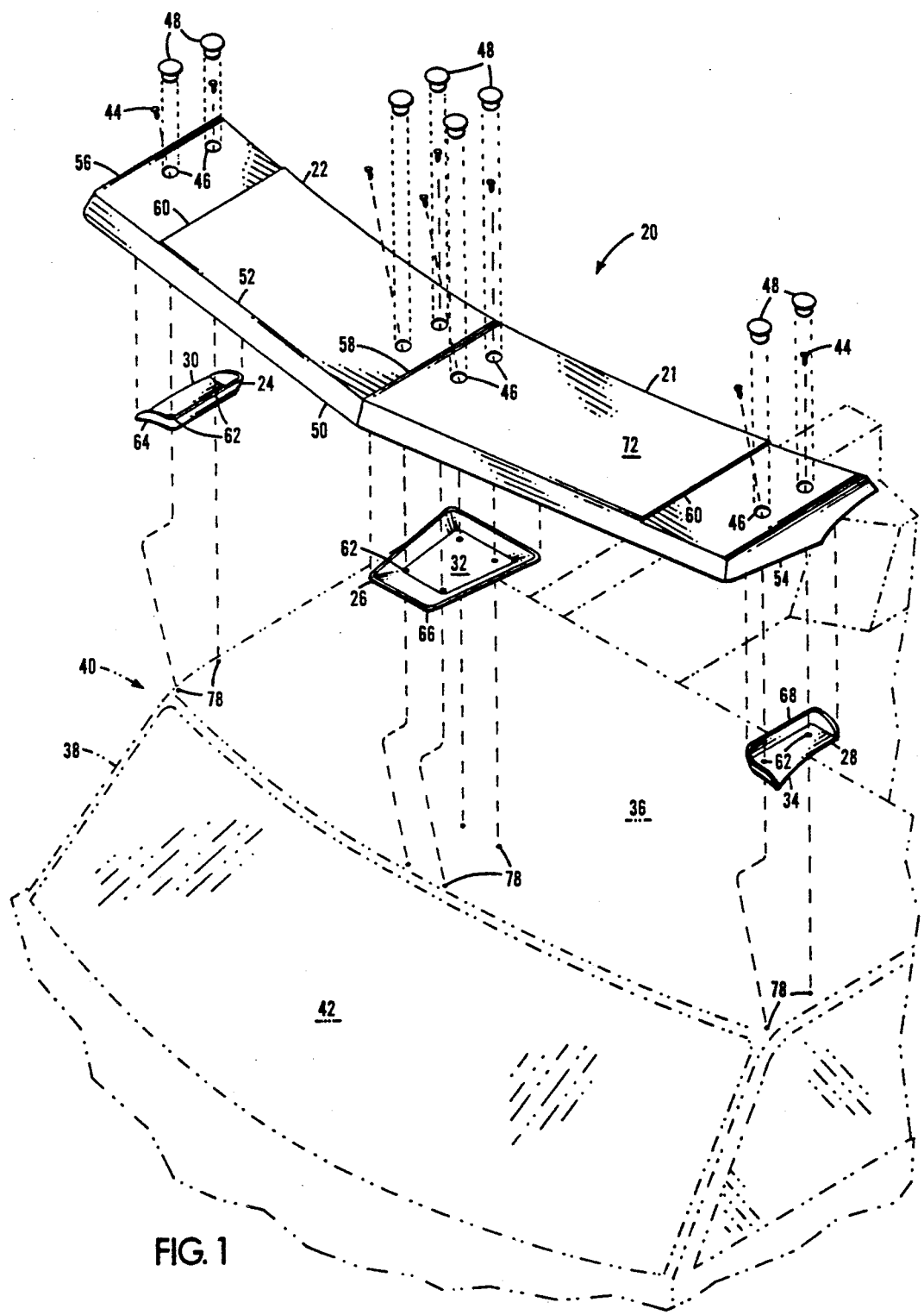
FIG. 1 is an exploded isometric view of the motor vehicle visor of the present invention.
Figure 2:
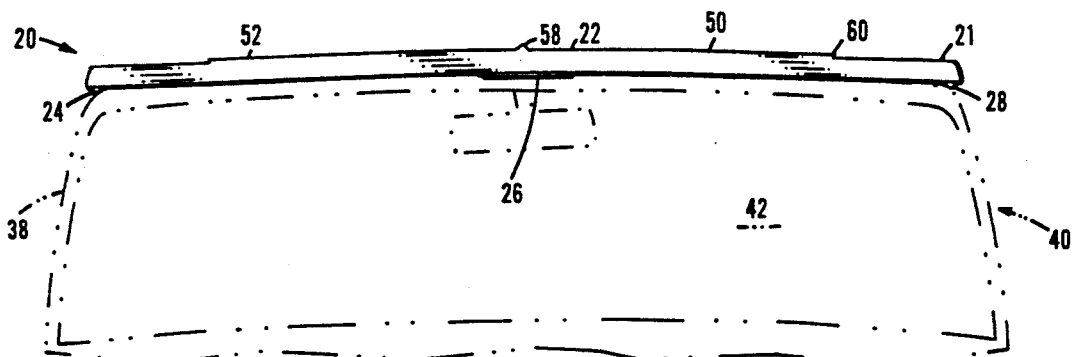
FIG. 2 is a front elevational view of the motor vehicle visor of FIG. 1.

Referring more particularly to FIGS. 1-20 wherein like numbers refer to similar parts, a motor vehicle visor 20 is shown in FIGS. 1-7. The visor 20 has a resin impregnated fiberglass visor shell 21 having a broad upper member 22 and three downwardly depending pods 24, 26, 28. The pods 24, 26, 28 have pod floors 30, 32, 34 respectively which engage against the upper surface 36 of the cab 38 of a motor vehicle 40 above the motor vehicle windshield 42. Fasteners 44 connect the pods 24, 26, 28 to the cab upper surface 36. Access holes 46 are located in the upper visor member 22 above the fasteners 44 and are covered by plastic plugs 48. Although the vehicle is shown as a conventional pick-up truck the visor of this invention may be attached to any conventional closed-body motor vehicle, such as a van or passenger car.

The upper visor member 22 of the visor shell 21 is generally horizontal and extends laterally approximately the width of the vehicle cab 38. The upper member 22 has a forward lip 50 which depends from the leading edge 52 of the upper visor member. The forward lip 50 adjoins side lips 54, 56 which depend downwardly from each side of the upper visor member 22. The lips 50, 54, 56 impart rigidity to the visor shell 21 as well as aiding in shielding the windshield 42 from the direct rays of the sun. For added stiffness, the upper visor member 22 has a central front-to-back crease 58 and indented steps 60 on each side of the upper visor member 22, although such creases and steps may be eliminated for appearance purposes. The visor shell 21 is formed as a unitary article having a thickness of approximately one quarter inch to one half inch. Eight access holes 46, each approximately one inch in diameter, are drilled through the upper visor member 22. Two access holes 46 are located on each side of the central crease 58, and two access holes 46 are located inwardly from each side lip 54, 56.

Each pod 24, 26, 28 has a floor 30, 32, 34 which is configured to match the surface geometry of the upper surface 36 of a particular vehicle cab 38. Fastener holes 62 are located in each pod floor.

Figure 4:
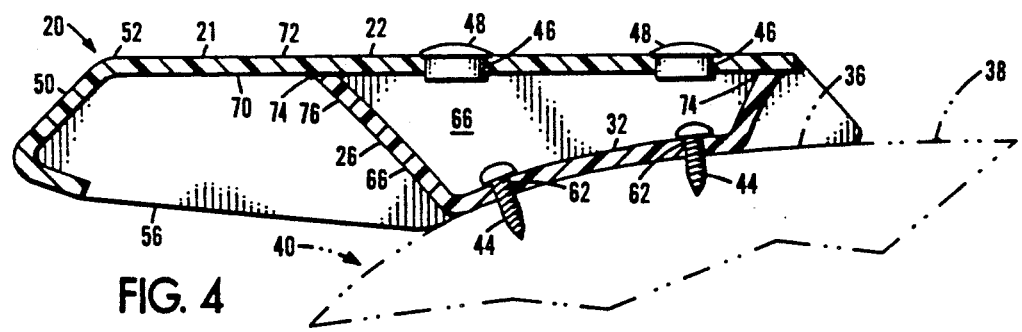
FIG. 4 is a cross-sectional view of the visor of FIG. 3 taken along section line 4—4.

Side walls 64, 66, 68 extend upwardly from each pod floor 30, 32, 34 respectively. The rigid side walls engage against and are fastened to the underside 70 of the upper visor member 22 beneath the top surface 72 of the upper visor member. As best shown in FIG. 4, the pod side walls 64, 66, 68 are preferably fixed to the upper visor member 22 by an acrylic two-part adhesive 74.

The center pod 26 has a side wall 66 which surrounds the pod floor 32 and which extends upwardly and outwardly from the pod floor 32 to engage fully against the underside 70 of the upper visor member 22.

The side pods 24, 28 have side walls 64, 68, respectively which extend from all but the outer edges of the pod floors 30, 34. Thus portions of the side walls 64, 68 are engaged with the visor upper member 22 and portions of the side walls also engage against the side lips 54, 56.

In each case, the pod floors, pod side walls, and the visor shell 21 define an enclosed rigid compartment. In the case of the center pod 26, this compartment is formed by the upper visor member 22 and the pod 26. In the case of the side pods 30, 34, the compartment is formed with the upper visor member and the side lips 54 or 56.

Figure 3:
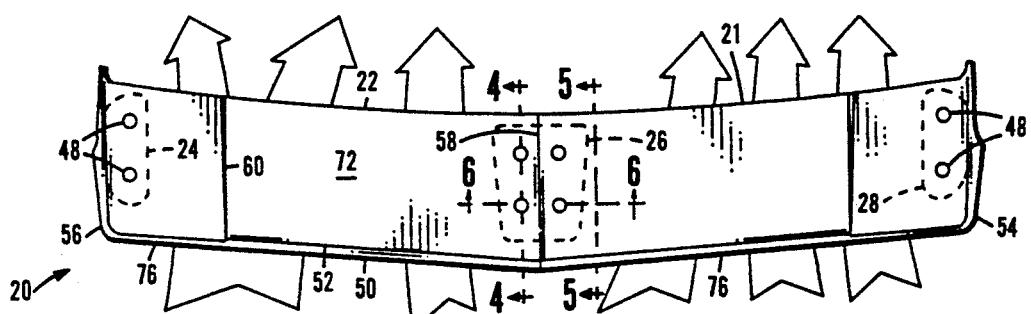
FIG. 3 is a top plan view of the visor of FIG. 1, with air flows shown schematically.
Figure 5:
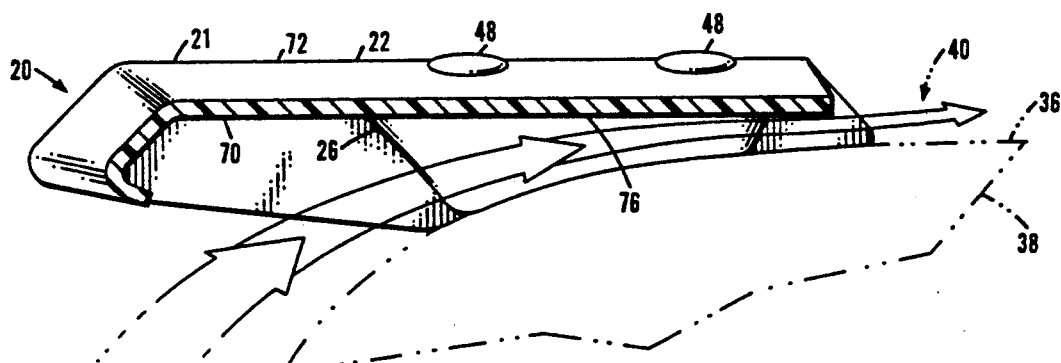
FIG. 5 is a cross-sectional view of the visor of FIG. 3 taken along section line 5—5 with air flows beneath the visor shown schematically.
Figure 6:
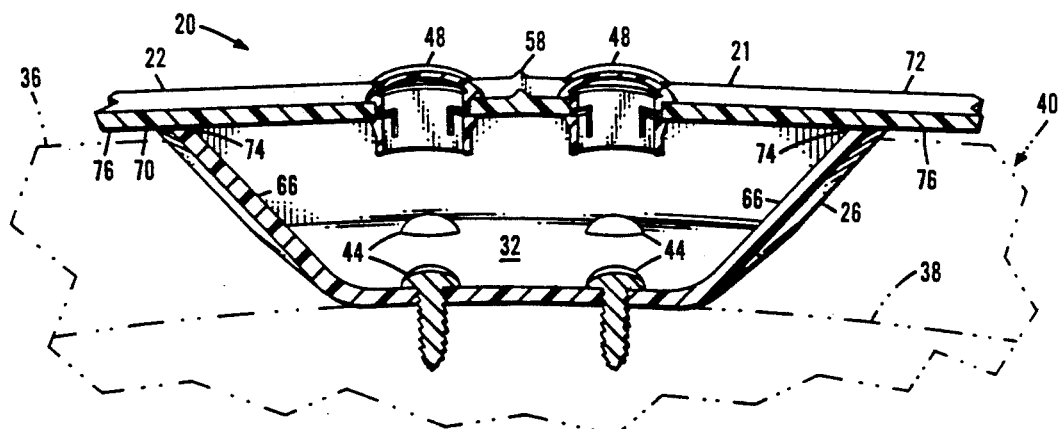
FIG. 6 is a cross-sectional view of the visor of FIG. 3 taken along section line 6—6.
Figure 7:
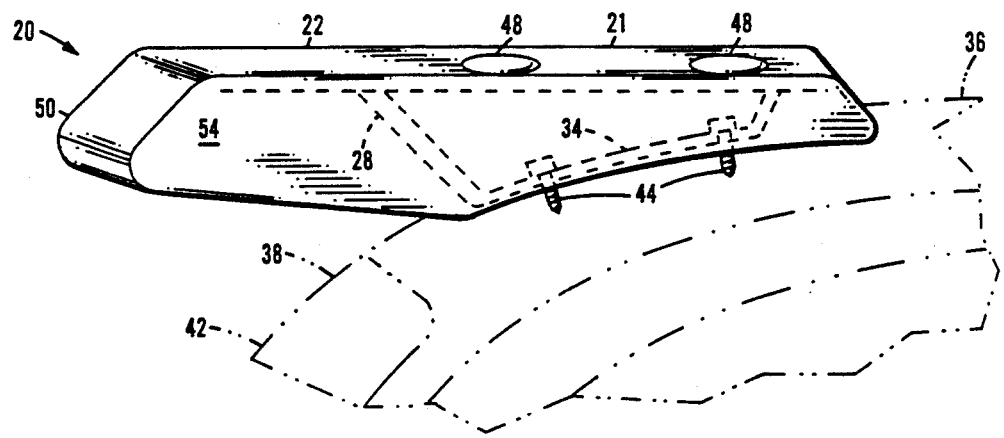
FIG. 7 is a driver's side elevational view of the visor of FIG. 1.

The pods 24, 26, 28 serve to space the upper visor member 22 a fixed distance from the upper surface 36 of the motor vehicle cab 38. This spacing of the upper visor member, as shown in FIGS. 3 and 5, creates air passages 76 between the pods and between the underside 70 of the upper visor member 22 and the upper surface 36 of the cab 38. The air passages 76 permit the flow of oncoming air beneath the visor 20 and over the motor vehicle 40, as shown schematically by the arrows in FIGS. 3 and 5. The air passages reduce the drag on the moving vehicle 40 created by the visor 20.

The visor shell 21, and the pods 24, 26, 28 are formed by conventional low pressure structural reinforced injection-molding (SRIM) techniques. A first mold having a cavity conforming to the dimensions of the top surface of the visor part is layered with an Ortho sanding gel coat approximately 0.02 inches thick. The gel coat forms a smooth paintable outer surface on the part. A 1.5 ounce per square yard continuous strand fiberglass mat of approximately the configuration of the mold interior is next laid into the gel coated mold. A second mold having portions conforming to the underside of the article being formed is next pressed up against the first mold and a resin injected at low pressures (30-80 psi) into the combined molds. The resin is preferably a "Polystar" resin, comprising a polyester-/urethane hybrid resin (approximately 70 percent polyester and 30 percent urethane) with isocynate and peroxide catalysts. This resin is preferably a quick drying blend in order to maximize production of parts. SRIM molds are typically epoxy with steel frames and utilize temperature control.

The visor shell 21 and pods 24, 26, 28 are preferably formed using SRIM methods. Parts so formed possess admirable strength and stiffness suited to visor applications.

As best shown in FIG. 1, the visor 20 is installed on a motor vehicle 40 by placing the visor 20 on the cab upper surface 36 with the fastener holes 62 in the pod floors 30, 32, 34 aligned with holes 78 drilled in the cab upper surface 36. Fasteners 44, which are preferably self-tapping screws, are inserted through the access holes 46 in the upper visor member 22 and are tightened into place connecting the pod floors 30, 32, 34 securely to the upper surface 36 of the cab 38. Once it has been ascertained that the visor is properly positioned on the vehicle 40 with the visor shell protruding forwardly from the upper surface 36 the desired amount above the windshield 42, the plastic injection-molded plugs 48, which will preferably have snap fastening members thereon, are inserted in each access hole 46 to seal the top surface 72 of the visor shell 21. To seal the interior of the pods 24, 26, 28 against the entry of water through the access holes 46, a bead of silicone sealant is preferably applied to each plug 48 before it is inserted into an access hole 46.

The installed visor 20 effectively shields the vehicle windshield 42 to limit the rays of the sun which enter the vehicle cab. The upper visor member 22 extends above the windshield 42 and has portions which extend over the windshield. At no point is the upper visor member 22 fastened directly to the vehicle cab 38 upper surface 36. The pods 30, 32 34, provide rigid extensions from the visor upper member 22 which mate appropriately with the geometry of the cab upper surface 36. Due to this advantageous spacing of the entire upper visor member 22 from the upper surface of the cab 36, it is not necessary to mold any scoops, setbacks, or cutaways into the visor shell 21. Although such structure may be added to the visor for purely ornamental purposes, the visor of the present invention does not require such structure to ensure proper air flow. By eliminating the need for scoops and the like, the visor 20 offers tremendous opportunities to the visor designer. Aesthetic and aerodynamic concerns may be given much greater attention, as the structural needs for attachment points have been satisfied by the pods. A wide variety of surface treatments, geometries, and styling cues may be employed to distinguish the visor upper member, without being constrained to have the visor upper member adjacent to the vehicle cab upper surface at any point.

Figure 11:
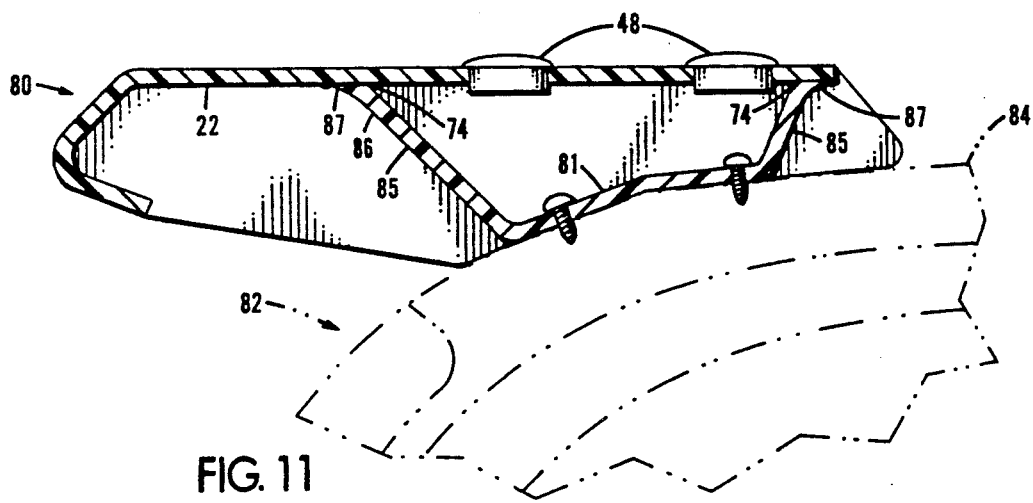
FIG. 11 is a cross-sectional view of an alternative embodiment of the motor vehicle visor of this invention having a pod with tapered flanges.

The visor of this invention may advantageously be tailored to any make or model of motor vehicle 40 by substituting alternative pods having geometries adapted to a particular motor vehicle upper surface. An alternative visor 80 is shown in FIG. 11. The visor 80 has a visor shell 21 which is identical to the shell 21 shown in FIG. 4, and, as a result, the exterior appearance of the visor 80 will be substantially identical to that of the visor 20. However, the vehicle 82 has an upper surface 84 which is distinctly different from the upper surface 36 shown in FIG. 4. For example only, this difference has been illustrated as a transverse crease, although the difference may well be a greater or lesser radius of curvature or inclination. The visor shell 21 is connected to the vehicle upper surface 84 by a pod 86 having a pod floor 81 which conforms to the surface 84. Visors may thus be provided for a wide variety of vehicles without necessitating the creation of a new visor shell mold and accruing the increased cost of new mold making. Furthermore, as it is only the pod floors which must conform to the geometry of the vehicle, the visor shell is left entirely free to take whatever shape is desired for aesthetic or aerodynamic reasons.

Figure 12:
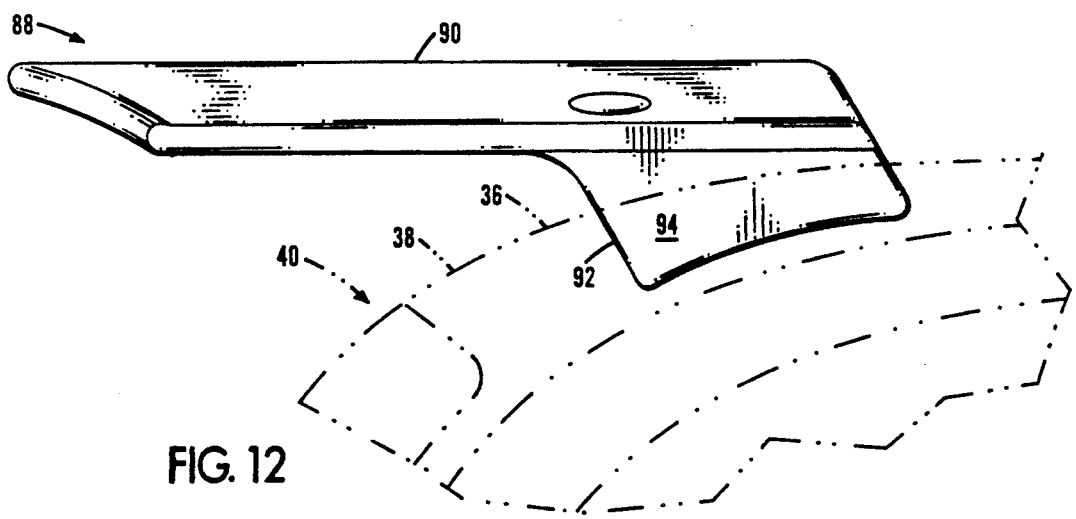
FIG. 12 is a cross-sectional view of an alternative embodiment of the motor vehicle visor of this invention.
Figure 13:
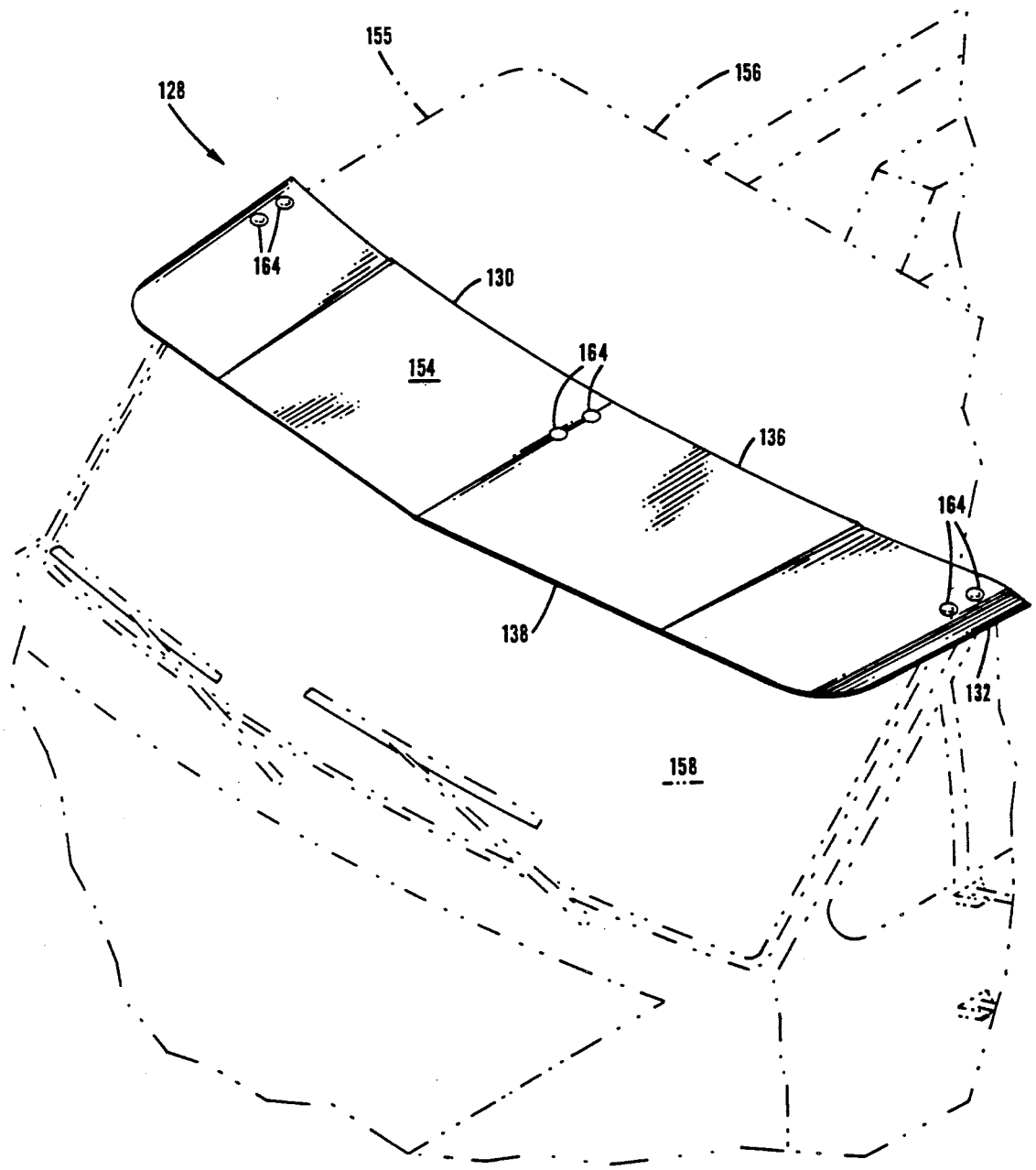
FIG. 13 is an isometric view of an alternative embodiment of the motor vehicle visor of this invention.
Figure 14:
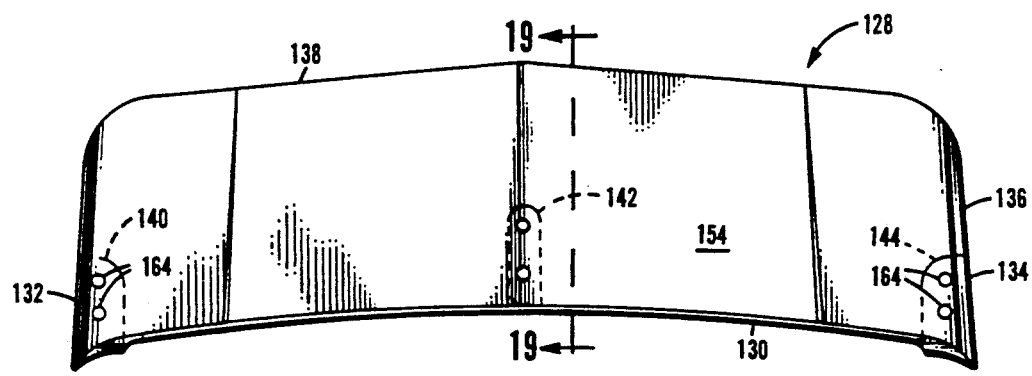
FIG. 14 is a top plan view of the visor of FIG. 13.
Figure 15:
FIG. 15 is a rear elevational view of the visor of FIG. 13.

Another alternative embodiment of a motor vehicle visor 88 of the present invention is shown in FIG. 12. The visor 88 has an elevated upper visor member 90 with side pods 92 which are narrower and taller and which have side walls 94 which surround the pod floors (not shown). Thus, it should be noted, the only limitation upon the geometry of the visor of this invention is that the pod floors conform to the vehicle cab upper surface at the required attachment locations. The appearance and structural characteristics of the visor shell in the pods may be varied over a wide range while still preserving a snug and rigid attachment of the visor to the vehicle.

A further pod design option is illustrated in the pod 86 of the visor 80 shown in FIG. 11. The pod 86 has a radiused flange 87 where the pod side walls 85 adjoin the visor upper member 22. The flange 87 may provide additional adhesive contact area in applications requiring greater adhesive strength between the pods and the visor shell 21.

Figure 8:
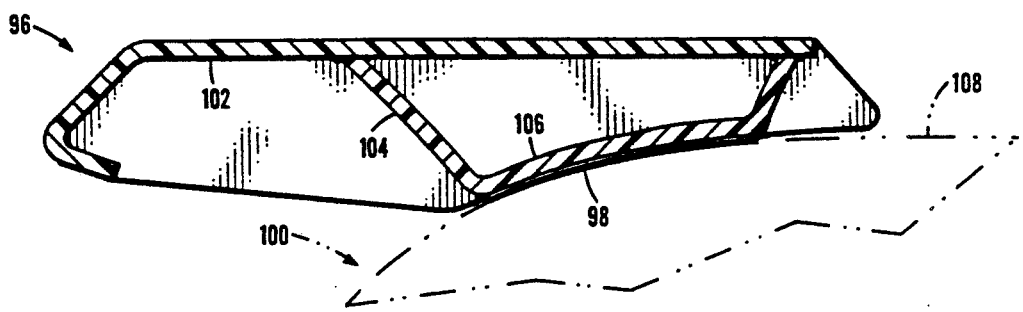
FIG. 8 is a cross-sectional view of an alternative embodiment of the motor vehicle visor of this invention having a structural tape attachment to a vehicle cab roof.

In applications where drilling of fastener holes through the vehicle roof is undesirable, a visor 96 of the present invention which employs structural tape 98 for adhesion to the motor vehicle 100 is shown in FIG. 8. The visor 96 has a visor shell 102 which may be formed on the same molds as the visor shell 21 yet which has not been drilled to form access holes into the pods. The pods 104 are likewise identical to the pods of the visor 20 except that the pods 104 have no fastener holes drilled therein. The structural tape 98 is adhesively attached to the pod floor 106 and to the vehicle upper surface 108.

An example of a structural tape which may be advantageously employed is the VHB acrylic foam tape, part number Y-4952 (NPE-1780) available from the Industrial Specialties Division of 3M, located in St. Paul, Minn. Another suitable tape available from the 3M Automotive Trades Division is the SCOTCHMOUNT TM Super Automotive Attachment Tape, part no. 06382, which has an acrylic foam tape with acrylic adhesive applied to both sides.

Figure 9:
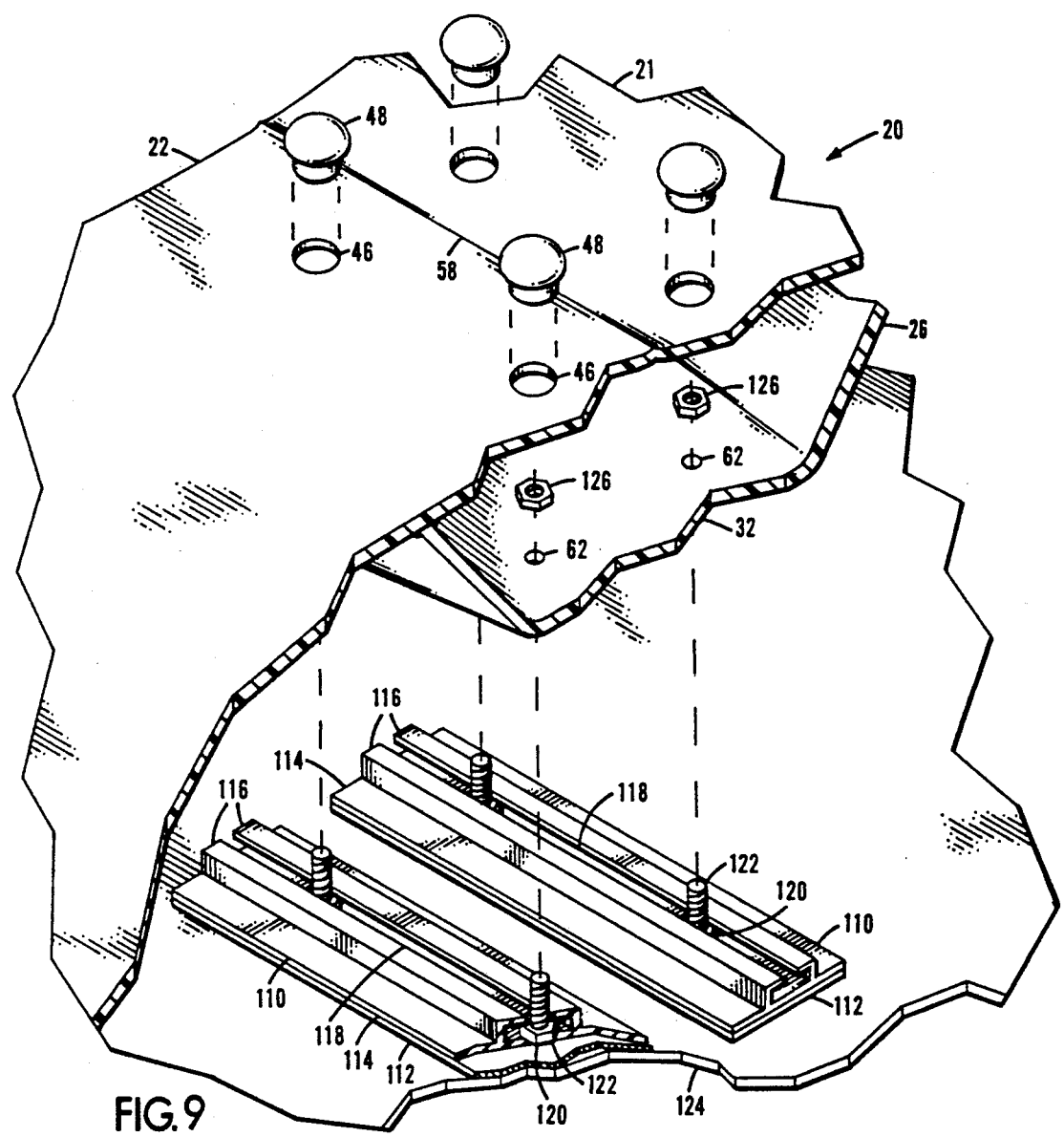
FIG. 9 is an exploded isometric view of an alternative attachment mechanism for attaching the visor of FIG. 1 to a vehicle cab roof.
Figure 10:
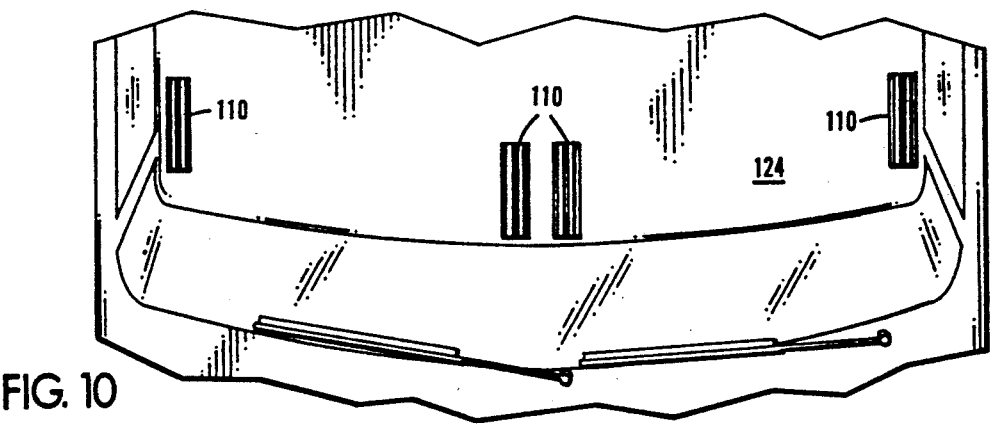
FIG. 10 is a top plan view of a vehicle cab roof having the attachment mechanism of FIG. 9 mounted thereon.

An alternative means for attaching the visor 20 shown in FIGS. 1-7, is illustrated in FIGS. 9 and 10. In place of connecting fasteners directly through the pod floors 30, 32, 34 into the vehicle cab 38, extruded structural plastic bolt retaining strips 110 backed with structural adhesive tape 112 may be employed. Each strip 110 has a base 114 which may be as wide as necessary to accommodate a sufficient area of adhesive tape to carry the required loads. Two brackets 116 extend upwardly from the base 114 and open towards one another to define an inverted T-shaped channel 118. The heads 120 of bolts 122 are retained within the channel 118. As best shown in FIG. 10 the bolt-retaining strips 110 with the structural adhesive tape attached thereto are positioned laterally on the vehicle cab upper surface 124 to be directly beneath the fastener holes 62 aligned within each pod floor 30, 32, 34. As best shown in FIG. 9, the visor 20 is then engaged against the strips 110. Nuts 126 are inserted through the access holes 46 and are tightened on the protruding bolts 122 to hold the visor in place with respect to the vehicle upper surface 124. If the original installation of the visor 20 is not optimal, the nuts 126 may be loosened and the visor 20 may be moved frontwardly or rearwardly along the strips 110 until a desired placement has been achieved. Such an attachment mechanism avoids the need for drilling holes through the vehicle cab and furthermore greatly reduces the possibility of misplacement of the visor on the vehicle cab. Examples of appropriate structural adhesive tapes are those manufactured by 3M and described above.

The pods may also be attached to the visor shell by means of structural adhesive tape.

Figure 16:
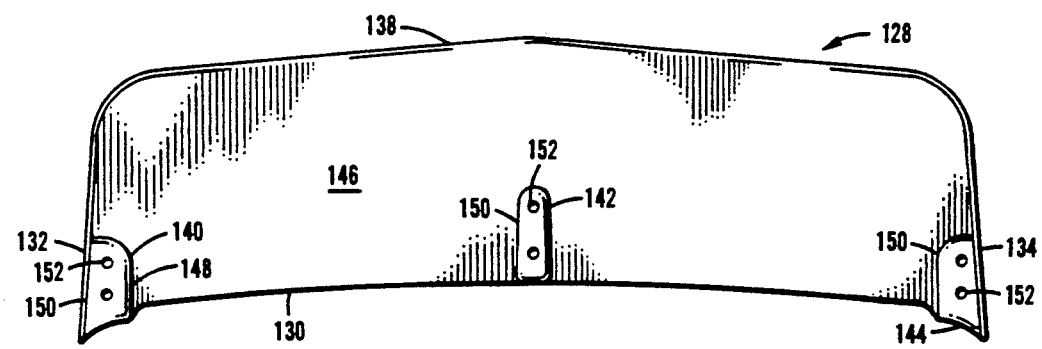
FIG. 16 is a bottom plan view of the visor FIG. 13.
Figure 17:
FIG. 17 is a front elevational view of the visor of FIG. 13.
Figure 18:
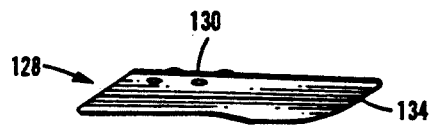
FIG. 18 is a left side view of the visor of FIG. 13.
Figure 19:
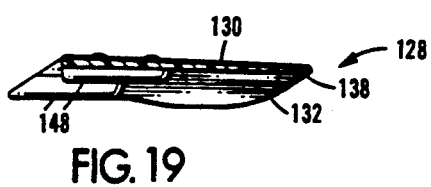
FIG. 19 is a cross-sectional view taken along section line 19—19 of FIG. 14.
Figure 20:
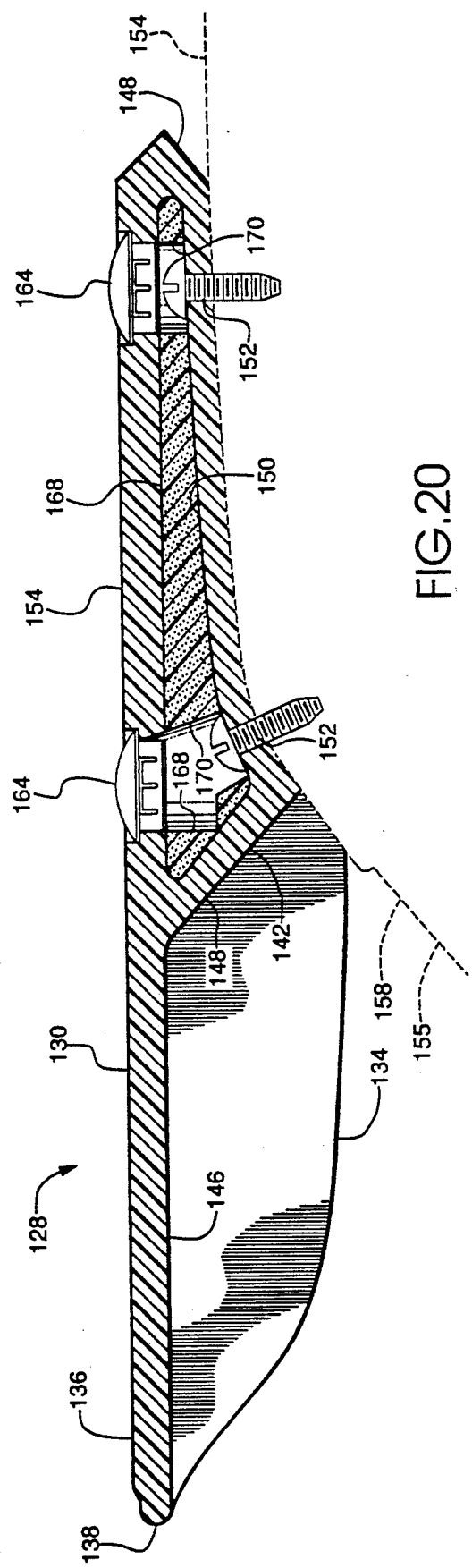
FIG. 20 is a cross-sectional view through the center pod of the visor of FIG. 14 mounted on a vehicle.

Yet another alternative embodiment of the visor of this invention is shown in FIGS. 13-20. The visor 128 has a visor shell 130 having side lips 132, 134. The visor shell 130 has no forward lip and presents a reduced frontal cross sectional area. As best shown in FIG. 16, the visor shell 130 has an upper visor member 136 which tapers to a reduced thickness at the upper visor member leading edge 138.

The visor 128 has three pods 140, 142, 144. The pods are connected to the underside 146 of the upper visor member 136 and are preferably formed integrally with the visor shell 130 utilizing SRIM techniques which employ a urethane foam insert placed within the mold prior to injection of the resin. The insert corresponds to the interior dimensions of a pod. Each pod 140, 142, 144 has a side wall 148 which extends upwardly from a pod floor 150. The pod side walls 148 space the upper visor member 136 from the pod floors 150 which are connected through bolt holes 152 to the upper surface 154 of the vehicle cab 156 above the vehicle windshield 158.

Access ways 170 through the foam insert 168 will typically be machined after completion of the molding process.

Air passages are formed between the pods 140, 142, 144 and the upper surface 154 of the cab 156 and the underside 146 of the upper visor member 136.

Plugs 164 are secured within access holes 166.

The visor 128 presents a minimal cross sectional area to the oncoming flow of air through which the vehicle 155 moves.

Where structural adhesive tape has been specified in the visor embodiments illustrated in FIGS. 8, 9, and 10, a mechanical polyolefin stem snap fastener such as the 3M Dual Lock fastening system may be employed. These two-part fasteners consist of tapes with adhesive on one side and a multiplicity of tiny mushroom-shaped polyolefin stems which snap together to form a high tensile closure.

It should be noted that although in a several embodiments the pods have been shown as molded separately from the visor shell, in certain applications it may be desirable to mold the pods simultaneously and integrally with the visor utilizing the SRIM technique such as by placing a structural foam insert within the mold prior to injection of the resin, the insert corresponding to the interior dimensions of a pod. This simultaneous molding will generally result in a smoother, more attractive visor undersurface eliminating glue joints. Visors may also be produced by other resin based processes which do not utilize fiberglass reinforcement, or by conventional fiberglass reinforced processes or by other conventional plastic molding or forming processes.

It is understood that the invention is not confined to the particular construction and arrangement of parts herein illustrated and described, but embraces such modified forms thereof as come within the scope of the following claims.

We claim:

1. A visor for a vehicle comprising:
   a) a laterally extending upper member, defining a visor upper forward shading position adapted to extend frontwardly over and shade a vehicle windshield and a rear attachment portion adapted to extend rearwardly over the vehicle cab;
   b) a plurality of visor attachment pods fixed to the visor upper member rear attachment portion and extending downwardly therefrom, wherein each attachment pod has an attachment floor for engagement against the surface of a vehicle cab rearward of the vehicle windshield, and a pod sidewall which extends upwardly from the pod floor and engages with and is fixed to the visor upper member, the pods serving to space the upper member attachment portion a fixed distance from the vehicle cab surface to provide passages for oncoming air beneath the visor upper member; and
   c) portions of the visor upper member defining access holes above each pod floor, the access holes being adapted to provide access to the pod floors for the insertion and removal of fasteners to connect the pods to the vehicle cab surface.

2. The visor of claim 1 further comprising a plug adapted to be inserted within each access hole, wherein the plug substantially fills the hole.

3. The visor of claim 1 further comprising:
   a) a plurality of bolt-retaining strips adapted to be affixed to a vehicle cab surface, with at least one strip positioned beneath each pod floor, wherein each strip has upwardly extending portions adapted to engage with and retain a bolt head;
   b) at least one bolt engaged with each strip and extending through a pod floor;
   c) a nut located within each pod and threadedly engaged with each bolt to secure the pods to the strips; and
   d) structural adhesive tape affixed to each strip and adapted to adhesively connect the strips to a vehicle cab surface.

4. A visor for a vehicle having a windshield and a cab surface above the windshield, comprising:
   a) a laterally extending fiberglass upper member, the upper member defining a visor forward shading portion being adapted to extend forwardly above a vehicle windshield to shade the vehicle windshield, and a visor rear attachment portion adapted to extend rearwardly over a vehicle cab;
   b) a plurality of fiberglass attachment pods fixed to the visor upper member attachment portion and extending downwardly therefrom, wherein each attachment pod has an attachment floor adapted for engagement against the vehicle cab surface rearward of the vehicle windshield, and wherein a pod side wall extends upwardly from each pod attachment floor and engages with and is connected to the visor upper member, the pod floor and side wall of each pod defining with the visor upper member a rigid compartment, and wherein the pods are adapted to space the entire upper member attachment portion from the vehicle cab surface to define passages between the visor upper member and the vehicle cab surface for the flow of air therethrough; and
   c) means for attaching the pod floors to the vehicle cab surface.

5. The visor of claim 4 further comprising portions of the visor upper member defining at least one access hole above each pod floor, wherein a plug is inserted within each access hole.

6. The visor of claim 4 wherein the means for attaching the pod floors to the cab surface comprises segments of double-sided adhesive structural tape.

7. The visor of claim 4 wherein the pod walls are adhesively connected to the visor upper member.

8. The visor of claim 4 wherein the means for attaching the pod floors to the vehicle cab surface comprises:
   a) a plurality of bolt-retaining strips adapted to be affixed to the vehicle cab surface, with at least one strip positioned beneath each pod floor, wherein each strip has upwardly extending portions adapted to engage with and retain a bold head;
   b) at least one bolt engaged with each strip and extending through a pod floor;
   c) a nut located within each pod and threadedly engaged with each bolt to secure the pods to the strips; and
   d) structural adhesive tape affixed to each strip and adapted to adhesively connect the strips to a vehicle cab surface.

9. A visor for a motor vehicle having a windshield and a cab surface extending rearwardly from the windshield, the visor comprising:
   a) a laterally extending upper member having a forward shading portion adapted to extend frontwardly above the windshield to shade the windshield and a rear attachment portion adapted to extend rearwardly over the motor vehicle cab surface;
   b) a plurality of visor attachment pods fixed to the visor upper member and extending downwardly therefrom, wherein each pod has a pod floor adapted to engage against the vehicle cab surface, and a side wall extends upwardly from the pod floor to engage with the visor upper member, and wherein the pods space the entire visor upper member above the vehicle cab surface, such that the visor upper member does not come in contact with the vehicle cab surface; and
   c) at least one fastener extending through each pod floor, and adapted to connect the pod floor to the vehicle cab surface, wherein no fastener directly connects the visor upper member to the vehicle cab surface and no portion of any fastener extends above the visor upper member.

10. The visor of claim 9 further comprising side lips depending from opposite sides of the visor upper member to rigidify the visor.

11. The visor of claim 9 wherein the pods are integrally formed with the visor upper member.

12. The visor of claim 9 further comprising a urethane insert within each pod.

* * * * *